(12) United States Patent
Kuo et al.

(10) Patent No.: US 7,921,638 B2
(45) Date of Patent: Apr. 12, 2011

(54) BI-PROPELLANT ROCKET MOTOR HAVING CONTROLLED THERMAL MANAGEMENT

(75) Inventors: Kenneth K. Kuo, State College, PA (US); J. Eric Boyer, State College, PA (US); Peter J. Ferrara, State College, PA (US)

(73) Assignee: Combustion Propulsion & Ballistic Technology Corp., State College, PA (US)

( * ) Notice: Subject to any disclaimer, the term of this patent is extended or adjusted under 35 U.S.C. 154(b) by 929 days.

(21) Appl. No.: 11/788,458

(22) Filed: Apr. 20, 2007

(65) Prior Publication Data

US 2008/0173004 A1 Jul. 24, 2008

Related U.S. Application Data

(60) Provisional application No. 60/793,683, filed on Apr. 20, 2006.

(51) Int. Cl.
*F02K 9/28* (2006.01)
*B64G 99/00* (2009.01)

(52) U.S. Cl. .......................................... 60/251; 60/204

(58) Field of Classification Search .............. 60/240, 60/200.1, 219, 220, 251, 252, 204; 239/127.1, 239/127.2, 239.15; 102/291
See application file for complete search history.

(56) References Cited

U.S. PATENT DOCUMENTS

| | | | | |
|---|---|---|---|---|
| 3,104,613 A * | 9/1963 | Rice et al. | ......................... | 60/240 |
| 3,158,994 A * | 12/1964 | Hodgson | ......................... | 60/220 |
| 3,300,978 A * | 1/1967 | Pennington | ..................... | 60/231 |
| 3,302,403 A * | 2/1967 | Krzycki et al. | ................. | 60/220 |
| 3,334,489 A * | 8/1967 | Vilet | ............................... | 60/251 |
| 3,350,887 A * | 11/1967 | Leunig et al. | ................... | 60/251 |
| 3,388,554 A * | 6/1968 | Hodgson | ......................... | 60/217 |
| 3,482,404 A * | 12/1969 | Kircher et al. | .................. | 60/259 |
| 3,668,872 A * | 6/1972 | Camp et al. | ..................... | 60/207 |
| 3,718,094 A * | 2/1973 | Bermender | ................... | 102/287 |
| 3,753,348 A * | 8/1973 | Burnside | ......................... | 60/219 |
| 5,010,730 A * | 4/1991 | Knuth et al. | .................... | 60/246 |
| 5,099,645 A * | 3/1992 | Schuler et al. | .................. | 60/219 |
| 6,470,669 B2 * | 10/2002 | Jones et al. | ..................... | 60/231 |
| 6,904,749 B2 * | 6/2005 | Joshi et al. | ...................... | 60/219 |
| 2005/0034447 A1 * | 2/2005 | Joshi et al. | ...................... | 60/253 |

\* cited by examiner

*Primary Examiner* — Michael Cuff
*Assistant Examiner* — Gerald L Sung
(74) *Attorney, Agent, or Firm* — McNees Wallace & Nurick LLC

(57) ABSTRACT

A bi-propellant rocket motor having controlled thermal management is disclosed. The rocket motor produces thrust using a solid or gel-phase primary propellant that can be either fuel- or oxidizer-rich, with a complementary self-pressurizing secondary propellant selected to balance the primary propellant in terms of the equivalence ratio. The motor houses multiple propellant grains arranged in such a configuration that each chamber containing a primary grain serves as both propellant storage and the main combustion chamber for that propellant grain as it burns with the secondary propellant. The secondary propellant is stored separately, and the flow routed past the primary propellant chamber to provide cooling for adjacent primary propellant chambers limiting the temperature rise in the motor structure.

9 Claims, 3 Drawing Sheets

BI-PROPELLANT ROCKET MOTOR HAVING CONTROLLED THERMAL MANAGEMENT

CROSS REFERENCE TO RELATED APPLICATION

This application claims the priority of U.S. provisional patent application No. 60/793,683, filed Apr. 20, 2006, which is incorporated herein by reference in its entirety.

STATEMENT REGARDING FEDERALLY SPONSORED RESEARCH OR DEVELOPMENT

Aspects of the invention disclosed herein were developed with government support under contract number HQ0006-06-C-7416 awarded by the Missile Defense Agency. The government may have certain rights in this invention.

FIELD OF THE INVENTION

The present invention is directed to rocket propulsion systems and more particularly to a bi-propellant rocket motor for use in, e.g., miniature exo-atmospheric vehicles.

BACKGROUND OF THE INVENTION

Current state-of-the-art propulsion systems include multiple-pulse motors that provide a measure of motor burn controllability in the form of liquid propellant thrusters. However, excess fuel flow is required for wall cooling in these liquid rocket engines, resulting in lower propulsive efficiency. Other known propulsion systems include conventional hybrid rocket propulsion systems in which solid fuel burns with a liquid or gaseous oxidizer flowing through the center of a hollow solid propellant grain creating a diffusion flame and providing thrust.

These prior systems have numerous shortcomings that make them undesirable or unsuitable for use. Rockets usually have severe weight limits for components related to propellant storage, thermal management systems, and the motor structure. In addition, rocket bodies, and particularly those classified as miniature devices, have a highly limited volume for total system packaging. Despite these limitations, rockets are primarily used in military and scientific exo-atmospheric applications that still require high-performance. Furthermore, these systems may be prone to undesirable thermal soak, resulting in unwanted initiation of propellant ignition in a multiple-pulse operation.

Thus, what is needed is a rocket propulsion system that meets these weight and volume restrictions while still providing high performance, so that selection of suitable propellants have high specific impulse and the rocket has a high mass fraction of propellant compared to the whole rocket vehicle weight.

What is also needed is a rocket propulsion system that overcomes thermal soak problems that can result in unwanted propellant ignition.

SUMMARY OF THE INVENTION

The rocket propulsion system according to exemplary embodiments of the present invention meets these needs by having a solid or gel-phase primary propellant that can be either fuel- or oxidizer-rich, with a complementary self-pressurizing secondary propellant selected to balance the primary propellant in terms of the equivalence ratio. The motor design includes separate chambers in the motor to house multiple primary propellant grains arranged in such a configuration that each chamber containing a primary propellant grain serves as both propellant storage and the main combustion chamber for that propellant grain. The flowable secondary propellant is stored separately in a secondary propellant chamber and is routed from the secondary propellant chamber past at least a portion of an active primary propellant chamber to provide cooling prior to combining the secondary and primary propellants to burn and generate thrust for the vehicle in which the propulsion system is installed. Flow of the secondary propellant past the active chamber serves to both enhance the performance of the propulsion system and provide regenerative cooling that reduces temperature rise in other inactive primary propellant chambers in the motor housing for which ignition may not be desired.

Embodiments of the rocket propulsion system of the present invention preferably produce thrust using a solid or non-flowing gelled propellant burning with a self-pressurized oxidizer and reduces or eliminates the need for a mechanical pump and complicated valve systems. The secondary propellant is driven through channels permeating the rocket motor body structure before being injected into an afterburner region.

One advantage of the invention is that no inert gas pressurizing system is needed.

Yet another advantage of the invention is that regenerative cooling allows multiple fuel or propellant charges to coexist in a compact cylindrical volume, facilitating a multiple pulsed-combustor design that provides flexibility for in-flight modifications of the rocket's course.

Yet another advantage of the invention is that the physical separation of energetic components provides enhanced propulsion system safety.

Still another advantage of the invention is that the rocket propulsion system provides high propulsive performance using a regenerative cooling system and high-energy propellant ingredients.

Another advantage of the invention is that the use of multiple thrust components provides in-flight start/stop capability to permit in-flight adjustments of flight path.

Still another advantage of the invention is that the rocket propulsion system reduces or eliminates certain mechanical systems found in conventional rockets, such as additional pressurizing and pumping systems, that often result in increased costs of manufacture and operation.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

According to an embodiment of the present invention, a rocket propulsion system is provided that produces thrust using a solid or gel-phase primary propellant that can be either fuel- or oxidizer-rich, with a complementary self-pressurizing secondary propellant chosen to balance the primary propellant in terms of the equivalence ratio. That is, if the solid or gel primary propellant is fuel-rich, then the self-pressurizing secondary propellant is oxidizer-rich and is preferably present in an amount to approach stoichiometric equivalence, and thereby approach maximum thrust. Embodiments of the invention are particularly advantageous for compact construction to provide low-weight, small-volume, high-performance miniature propulsion systems for exo-atmospheric applications, and are particularly suitable for use with Divert and Attitude Control Systems for incorporation into rockets for military and scientific uses. As used herein, miniature is meant to refer to a propulsion system having a mass of about 1.5 kg, although the invention is not so limited and may be scaled to a smaller or larger size depending on the desired application.

Figure 1:
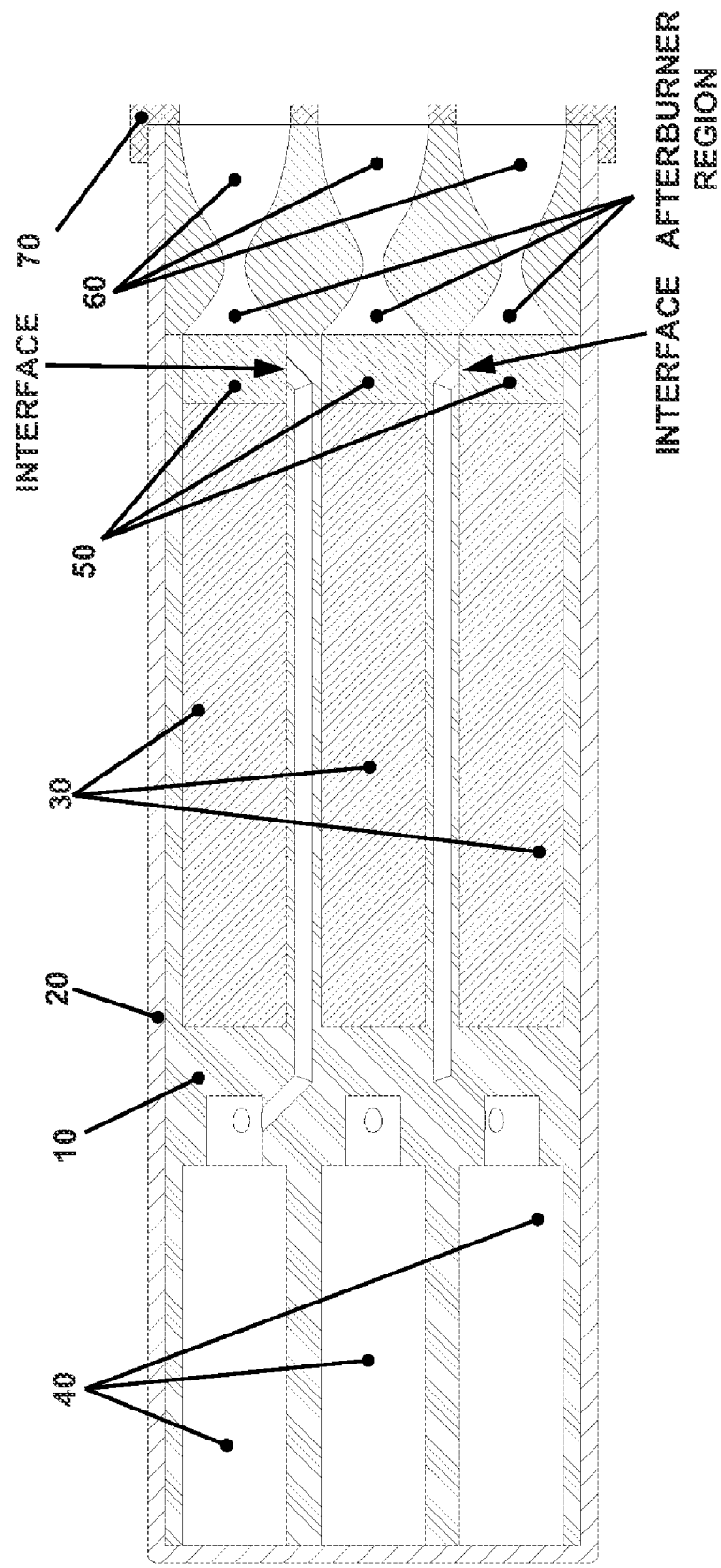
FIG. 1 illustrates a cross-sectional view of a compact bi-propellant rocket motor in accordance with an embodiment of the invention having end-burning propellant grains enhanced by vaporizing secondary propellant flow.

FIG. 1 illustrates an exemplary embodiment of the invention using end-burning primary propellant grains in separate chambers into which secondary propellant from an associated secondary propellant storage chamber is introduced. The example embodiment of FIG. 1 depicts a lateral cross-sectional view of a rocket motor comprising a motor body structure 10 within a casing 20 and a nozzle retainer 70, including three primary propellant storage 30 chambers each coupled to a valve 50 (e.g., the booster charge) and a nozzle 60, in addition to three secondary storage 40 chambers.

The motor design houses multiple chambers such that multiple solid or gel propellant grains may be arranged in such a configuration that each chamber containing a primary grain serves as both the primary propellant storage and the main combustion chamber for that propellant grain. The primary propellant is consumed in an end-burning fashion and regresses in the storage/combustion chamber as it reacts with the complementary secondary propellant. More specifically, the secondary propellant is stored separately and away from the primary propellant, is flowed past an associated primary propellant chamber into which it will be introduced and finally is introduced into that primary propellant chamber.

The flow of the secondary propellant to the primary propellant for combustion is routed past the primary propellant chamber to provide cooling as combustion occurs in that chamber, limiting the temperature rise in the motor structure and thus limiting temperature rise of other primary propellant grains in other chambers not ready for ignition. This cooling thereby reduces the likelihood of premature ignition of adjacent primary propellant grains that could result in undesirable operation or catastrophic loss of the vehicle. Conversely, the heat absorbed by the secondary propellant increases in thermal energy, resulting in a more energetic reaction with the primary propellant. Thus, flow of the secondary propellant serves to both enhance the performance of the propulsion system and provide regenerative cooling to the surrounding structure.

The primary propellant can either be a fuel-rich or oxidizer-rich material. The form of the primary propellant may be a solid grain or immobile, i.e., non-flowing, gel. If solid, the primary propellant may be any suitable propellant, such as a double-base composition (typically nitroglycerin/nitrocellulose), or a composite propellant, for example. Gel propellants typically comprise a mixture of liquid propellant and particles of an energetic ingredient such as cyclotrimethylenetrinitramine (commonly referred to as RDX) or ammonium dinitramide (commonly referred to as ADN), gelled using nano-sized aluminum particles. Other gelling agents such as fumed silicon dioxide or various gums may also be used.

Accordingly, in an embodiment of the invention, the primary propellant comprises a fuel additive selected from the group consisting of cyclotrimethylenetrinitramine, ammonium dinitramide, aluminum, ammonium perchlorate, ammonium nitrate, silicon dioxide, and combinations thereof.

In another embodiment, the primary propellant comprises a binder selected from the group consisting of hydroxyl-terminated polybutadiene, nitroglycerine, nitrocellulose, nitromethane, and combinations thereof.

The primary propellant may also contain curing agents, catalysts, and burn rate modifiers.

An example primary propellant comprises an under-oxidized solid propellant that has stable and predictable burning characteristics at low pressure (e.g., 100<P<1000 psi). Due to the small nozzle throat size necessitated by the small scale of the thruster, the propellant should not form large agglomerates or generate slag in the combustion products. This can be most easily achieved by using a formulation that does not contain metals such as aluminum that could form condensed-phase products. The propellant should be classified as no more hazardous than Hazard Class/Division 1.3 and preferably have Insensitive Munitions characteristics. An example primary propellant contains a small amount of ammonium perchlorate ("AP") as an oxidizer and a high percentage of hydroxyl-terminated polybutadiene ("HTPB") as a binder.

The flowable secondary propellant is selected to complement the primary propellant, e.g., either fuel- or oxidizer-rich material to enhance combustion system performance. The secondary component is preferably initially stored in the liquid phase under pressurized conditions in the secondary propellant storage chamber. The secondary propellant should have a relatively high vapor pressure at the operating temperatures of the propulsion system, i.e., sufficiently high to allow for self-pressurization. By selecting a self-pressurizing secondary propellant, the need for a pumping system is eliminated.

An example secondary propellant comprises a material that is gaseous at ambient temperature and pressure (e.g., 1 atm, 25° C.), and has a vapor pressure greater than the desired chamber pressure (e.g., nominally 500 psi). The upper limit of acceptable vapor pressure is governed by practical considerations of storage tank design strength balanced by the need for minimal system weight. The secondary propellant material should not freeze under normal storage conditions. The presence of a phase change as the material flows from the reservoir equilibrium conditions to the combustor is also beneficial to absorb additional energy from the structure. An example of a material meeting these conditions is nitrous oxide ($N_2O$).

As the system operates and the secondary propellant is gradually depleted, the energy used to gasify the secondary propellant from the liquid phase allows for additional thermal energy to be transferred to the secondary propellant, reducing the heat available for transfer into the structure around the active primary propellant chamber. This energy is further recovered by injecting the gasified secondary propellant flow into the combustion chamber.

Where the primary propellant is selected to be fuel-rich, exemplary secondary components are nitrous oxide ($N_2O$) or liquid oxygen ($O_2$). The secondary propellant serves as an oxidizer in the combustion process and also functions as a coolant for the primary propellant storage structure. The vapor pressure of $N_2O$ at room temperature is about 815 psia and is self-pressurizing. If the primary propellant is oxidizer-rich, the secondary propellant is fuel rich, typically liquid propane and/or other liquid hydrocarbons, although it will be appreciated that any self-pressurizing material that complements the primary propellant may be selected for the secondary propellant.

The flow rate of the primary propellant at the desired operating pressure is governed mainly by propellant burning rate, burning surface area of the propellant grain, and nozzle throat diameter, balancing the mass production rate due to burning with the mass discharging rate from the exit nozzle. The flow rate of secondary propellant is controlled by the valve opening, flow resistance in the restrictor (if present), and flow resistance in the channel(s) between the secondary propellant storage chamber and primary combustion chamber. The valve, restrictor, and channel geometry are designed such that the flow of secondary propellant into the primary combustion chamber results in a mixture that enhances the propulsive performance of the primary propellant, as measured by specific impulse or density specific impulse. The overall oxidizer-to-fuel ratio of the combined primary and secondary propellant flows should be near stoichiometric. Another factor in selecting the secondary flow rate is that the cooling rate required for desired operation is provided by the secondary flow around the primary combustion chamber.

Exemplary embodiments of the present invention reduce or eliminate the need for a mechanical pump and complicated valve systems. Instead, the pre-pressurized secondary propellant flows through one or more secondary propellant delivery channels permeating the motor body structure past the active primary propellant chamber en route to the combustion chamber, which is also the primary propellant storage chamber of the active primary propellant. This cooling system allows multiple primary propellant charges to coexist in a very compact cylindrical volume without fear of unwanted thermal initiation of ignition.

As mentioned previously, multiple primary propellant storage chambers are built into the motor body structure for separately storing multiple primary propellant charges. The regenerative cooling system comprises channels between the primary chambers through which the secondary propellant flows from secondary propellant storage chambers. Preferably, the propulsion system includes a like number of secondary propellant storage chambers and primary propellant storage chambers. The channels carry the secondary propellant from a location forward of the primary propellant storage chambers, along and past the active primary propellant chamber to assist in thermal management, and is then delivered into an afterburner region at the downstream location of the primary chamber. By delivering the secondary propellant to the afterburner region of the primary chamber, the primary propellant burns from one end until depleted. A small disk of a solid or gel like booster propellant is preferably used in the primary chamber and initially serves as a valve that blocks delivery of the secondary propellant to the primary chamber. In this manner, the initial ignition of any primary chamber results in burning the booster propellant to provide the thrust until the booster propellant is depleted. Once the booster propellant is depleted, the secondary propellant freely contacts the end of the primary propellant, providing the primary source of propulsion for vehicle in which the propulsion system is installed.

Flow of the secondary propellant serves to transport thermal energy from the structure, to prevent unwanted initiation of other nearby primary propellant chambers, and into the afterburner region, conserving energy that would otherwise be lost to the surroundings and thereby optimizing system performance. The addition of oxidizer- or fuel-rich secondary propellant to the product gases from the fuel- or oxidizer-rich primary propellant, respectively, also enhances performance by moving the overall equivalence ratio closer to unity.

Figures 2A, 2B, 2C:
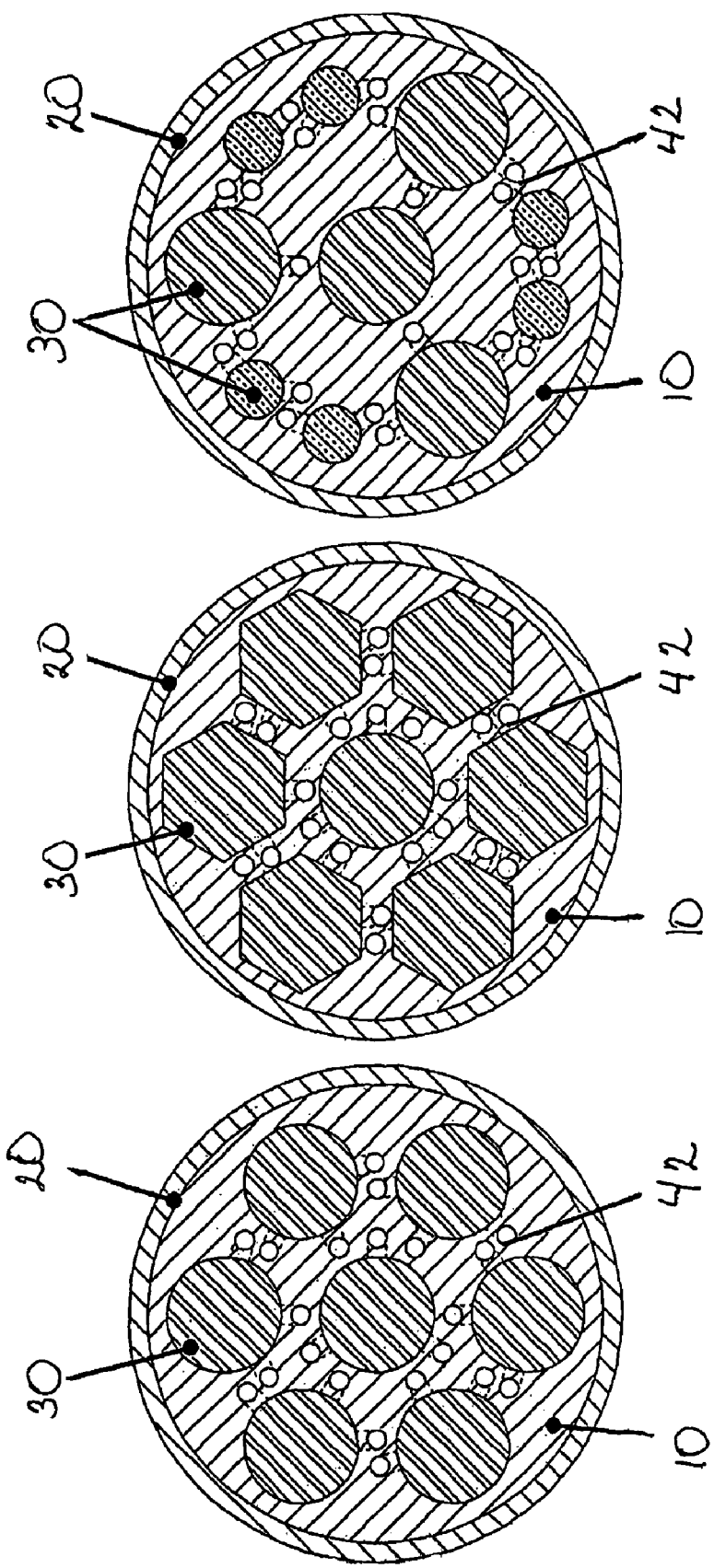
FIGS. 2a-2c illustrate examples of primary chambers and secondary flow channel arrangements in accordance with exemplary embodiments of the invention.

Some exemplary arrangements of primary propellant chambers 30 and secondary propellant flow channels 42 are shown in FIGS. 2*a* through 2*c*. Primary propellant mass and chamber size are based on propellant volume necessary to achieve a desired burn time and thrust level, which may vary depending on the desired end use. Secondary propellant mass is selected to achieve the desired oxidizer to fuel ratio and cooling effect. The number, shape, and size of flow channels 42 for the secondary propellant delivery may be selected based on the amount of energy desired to be transferred from the burning propellant in the primary chamber to the secondary propellant and the amount of heat the motor body structure 10 can safely absorb without risking unintentional ignition of other primary propellant grains 30 in the propulsion system. Preferably the number of channels 42 is minimized to reduce production costs, but multiple channels 42 may be used with each primary chamber 30. The arrangement of primary chambers 30 can also affect the number and placement of secondary propellant flow channels 42.

Returning to the Figures, in pulsed operation, multiple nozzles 60 are employed, preferably using a single nozzle 60 for each primary propellant chamber 30. The nozzles 60 for the multiple primary propellant chambers 30 are preferably canted such that the thrust vector passes though the nominal center-of-gravity of the vehicle in which the propulsion system in installed, thereby minimizing the moment imparted to the vehicle from off-axis thrust. This cant angle arrangement corresponds to the expected firing sequence of the primary propellant grains in the primary propellant chambers 30. Thus, exemplary embodiments of the invention result in a multiple pulsed-rocket motor design that facilitates restart capabilities and mission flexibility.

Ignition of primary propellant grains can be controlled separately, fired either singly in sequence (at regular or irregular intervals), or in groups. This provides operation in a manner similar or equivalent to a restartable thruster. A small disk of propellant at the base of each primary propellant grain acts as an igniter booster charge and also as a valve to allow flow of the secondary propellant to start flowing after the booster propellant is depleted. After ignition of the primary propellant, each primary propellant grain burns until it is entirely consumed. Because the secondary propellant is preferably stored in multiple separate chambers, only the secondary propellant associated with a particular active primary chamber flows until it is exhausted, as well, ensuring that sufficient secondary propellant remains for combustion of any remaining primary propellant grains that are subsequently ignited.

Thus, exemplary embodiments of the invention produce thrust using a solid or non-flowing gelled primary propellant burning with a self-pressurized secondary propellant without the need for a mechanical pump or complicated valve systems. Instead, the pre-pressurized liquid secondary propellant is driven through channels permeating the rocket motor body structure before being injected into the afterburner region. No inert gas pressurizing system is needed. This cooling system allows multiple fuel or propellant charges to coexist in very compact configuration such as a cylindrical volume, leading to a multiple pulsed-combustor design that will facilitate mission flexibility.

Figure 3:
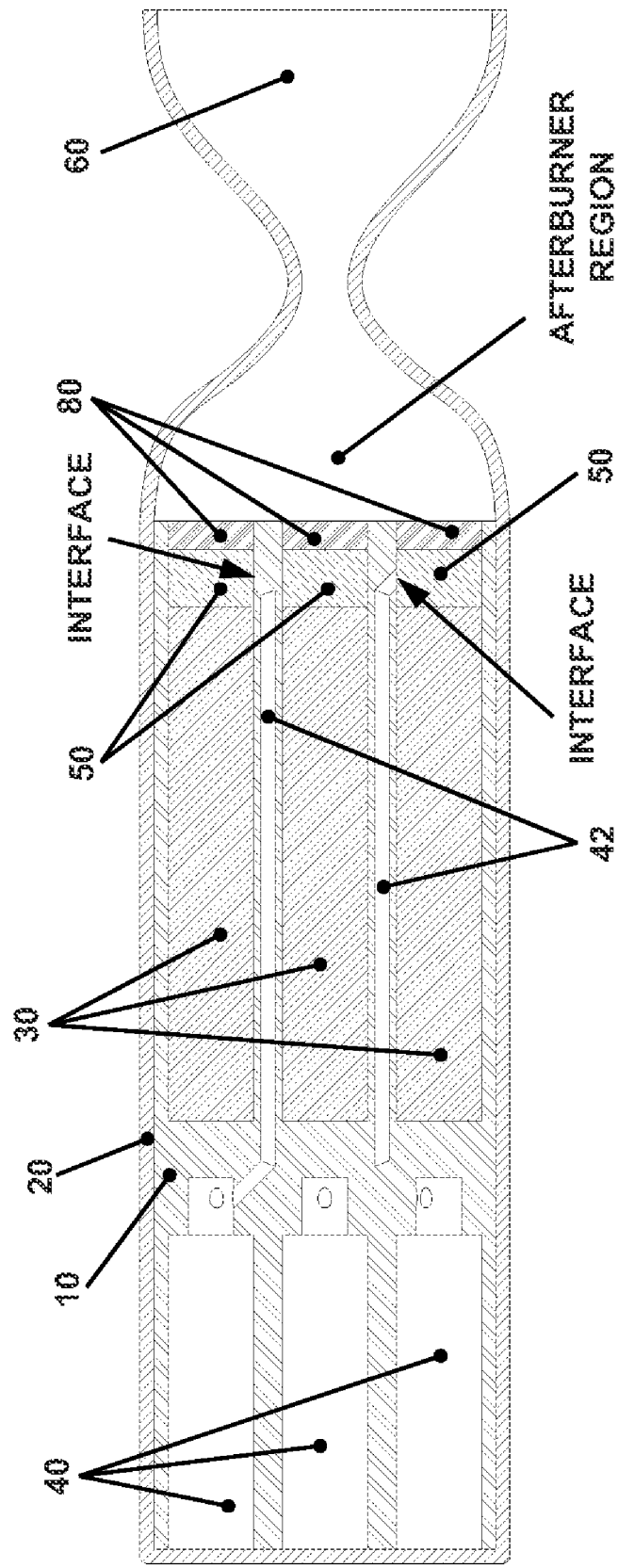
FIG. 3 illustrates a cross-sectional view of a compact bi-propellant rocket motor in accordance with another embodiment of the invention having end-burning propellant grains enhanced by vaporizing secondary propellant flow.

It should be appreciated however, that embodiments of the current invention are not limited to multiple pulsed combustor propulsion systems and could also be used in conjunction with a single nozzle system as shown in FIG. 3, which includes the addition of a flame inhibitor 80 in the primary propellant chambers to prevent premature ignition that may otherwise occur due to the heat in the common exhaust nozzle.

Thus, embodiments of the present invention provide controllable rocket motor technology that provides greater flexibility and capability for rockets assigned to various exoatmospheric missions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A miniature rocket propulsion system comprising:
a plurality of primary propellant storage chambers separated by a motor body structure, at least a portion of which contains a non-flowable, aft end-burning primary propellant;
a plurality of secondary propellant storage chambers, at least a portion of which contains a flowable secondary propellant, wherein the secondary propellant is complementary to the primary propellant, the secondary propellant being self-pressurizing, having a vapor pressure at ambient conditions of greater than the combustion pressure of the primary propellant in the primary propellant storage chambers; and
at least one secondary propellant delivery channel associated with each secondary propellant storage chamber, the channel connecting the secondary propellant storage chamber to the primary propellant storage chamber, the channel passing through the motor body structure and along at least a portion of the length of the primary propellant storage chamber, the channel configured to introduce the secondary propellant to an afterburner region of the primary propellant storage chamber or a nozzle proximate thereto, wherein the secondary propellant is delivered directly to the afterburner region of the primary propellant storage chamber following depletion of the primary propellant past an interface of the secondary propellant delivery channel and the primary propellant storage chamber,
wherein the rocket propulsion system has a mass of about 1.5 kg or less.

2. The rocket propulsion system according to claim 1, wherein the primary propellant comprises a fuel additive selected from the group consisting of cyclotrimethylenetrinitramine, ammonium dinitramide, aluminum, ammonium perchlorate, ammonium nitrate, silicon dioxide, and combinations thereof.

3. The rocket propulsion system according to claim 1, wherein the primary propellant comprises a binder selected from the group consisting of hydroxyl-terminated polybutadiene, nitroglycerine, nitrocellulose, nitromethane, and combinations thereof.

4. The rocket propulsion system according to claim 1, wherein the primary propellant comprises a curing agent, a catalyst, or a burn rate modifier.

5. The rocket propulsion system according to claim 1, wherein the secondary propellant is gaseous at ambient temperature and pressure.

6. The rocket propulsion system according to claim 1, wherein the secondary propellant is selected from the group consisting of nitrous oxide, oxygen, a hydrocarbon, and combinations thereof.

7. The rocket propulsion system according to claim 1, wherein the primary propellant and the secondary propellant are present in stoichiometrically equivalent amounts.

8. A miniature rocket propulsion system comprising:
a plurality of primary propellant storage chambers for receiving a non-flowable, aft end-burning primary propellant, wherein the primary propellant storage chambers are separated by a motor body structure;
a plurality of secondary propellant storage chambers for receiving a flowable, self-pressurizing secondary propellant, wherein the secondary propellant is complementary to the primary propellant, the secondary propellant being self-pressurizing, having a vapor pressure at ambient conditions of greater than the combustion pressure of the primary propellant in the primary propellant storage chambers; and
at least one secondary propellant delivery channel associated with each secondary propellant storage chamber, the channel connecting the secondary propellant storage chamber to the primary propellant storage chamber, the channel passing through the motor body structure and along at least a portion of the length of the primary propellant storage chamber, the channel configured to introduce the secondary propellant to an afterburner region of the primary propellant storage chamber, wherein the secondary propellant is delivered directly to the afterburner region of the primary propellant storage chamber following depletion of the primary propellant past an interface of the secondary propellant delivery channel and the primary propellant storage chamber,
wherein the rocket propulsion system has a mass of about 1.5 kg or less.

9. A method of operating a rocket propulsion comprising:
providing a rocket propulsion system comprising
a plurality of primary propellant storage chambers separated by a motor body structure, at least a portion of which contains a non-flowable, aft end-burning, primary propellant;
a plurality of secondary propellant storage chambers, at least a portion of which contains a flowable secondary propellant, wherein the secondary propellant is complementary to the primary propellant, the secondary propellant being self-pressurizing, having a vapor pressure at ambient conditions of greater than the combustion pressure of the primary propellant in the primary propellant storage chambers; and
at least one secondary propellant delivery channel associated with each secondary propellant storage chamber, the channel connecting the secondary propellant storage chamber to the primary propellant storage chamber, the channel passing through the motor body structure and along at least a portion of the length of the primary propellant storage chamber, the channel configured to introduce the secondary propellant to an afterburner region of the primary propellant storage chamber or a nozzle proximate thereto, wherein the secondary propellant is delivered directly to the afterburner region of the primary propellant storage chamber following depletion of the primary propellant past an interface of the secondary propellant delivery channel and the primary propellant storage chamber, wherein the rocket propulsion system has a mass of about 1.5 kg or less; and propelling the rocket propulsion system in such a manner that the thermal energy used to gasify the secondary propellant is provided by the combustion reaction and thereby allows for additional energy to be transferred to the secondary propellant while reducing the heat available for transfer into the rocket structure.

* * * * *